(12) United States Patent
Sieme et al.

(10) Patent No.: US 12,071,192 B2
(45) Date of Patent: Aug. 27, 2024

(54) BICYCLE LOCK MOUNTING BRACKET

(71) Applicant: Schlage Lock Company LLC, Carmel, IN (US)

(72) Inventors: Joerg Sieme, Ostbevern (DE); Arno Winter, Ahaus Ottenstein (DE); Ramamohan Bhaskar Shettigar, Thane (IN)

(73) Assignee: Schlage Lock Company LLC, Carmel, IN (US)

( * ) Notice: Subject to any disclaimer, the term of this patent is extended or adjusted under 35 U.S.C. 154(b) by 21 days.

(21) Appl. No.: 17/639,944

(22) PCT Filed: Sep. 3, 2019

(86) PCT No.: PCT/US2019/049278
§ 371 (c)(1),
(2) Date: Mar. 3, 2022

(87) PCT Pub. No.: WO2021/045721
PCT Pub. Date: Mar. 11, 2021

(65) Prior Publication Data
US 2022/0324529 A1    Oct. 13, 2022

(51) Int. Cl.
*B62J 11/00*  (2020.01)
*E05B 71/00*  (2006.01)
*F16B 2/08*   (2006.01)

(52) U.S. Cl.
CPC .......... *B62J 11/00* (2013.01); *E05B 71/00* (2013.01); *F16B 2/08* (2013.01)

(58) Field of Classification Search
CPC .......... B62J 11/00; B60R 2011/0294; B60R 2011/0258; B60R 2011/0252; B60R 2011/0241
(Continued)

(56) References Cited

U.S. PATENT DOCUMENTS

| 1,974,628 A | * | 9/1934 | Donald | E01B 25/24 248/228.3 |
| 5,438,936 A | * | 8/1995 | Wang | B60N 3/001 108/44 |

(Continued)

FOREIGN PATENT DOCUMENTS

| CN | 203753284 U | 8/2014 |
| CN | 203854782 U | 10/2014 |

(Continued)

OTHER PUBLICATIONS

International Search Report; International Searching Authority; International Application No. PCT/US2019/049278; Nov. 25, 2019; 3 pages.

(Continued)

*Primary Examiner* — Scott T McNurlen
(74) *Attorney, Agent, or Firm* — Taft Stettinius & Hollister LLP (57) ABSTRACT

An exemplary mounting bracket is configured for releasably securing a bicycle lock to a bicycle, and generally includes a housing, a pair of opposing arms, a pinion, a latch, and a manual actuator. The arms are movably mounted to the housing for movement between inward positions and outward positions, and each arm includes a rack gear. The pinion is engaged with each rack gear and correlates movement of the arms such that the arms move with one another between the outward positions and the inward positions. The latch has a latching position in which the latch is operable to maintain the arms in the inward position, and has an unlatching position in which the arms are free to move from the inward position to the outward position. The manual actuator is operable to move the latch between the latching position and the unlatching position.

22 Claims, 8 Drawing Sheets

(58) Field of Classification Search
USPC ... 248/229.12, 229.22, 228.3, 230.3, 231.41, 248/316.4
See application file for complete search history.

(56) References Cited

U.S. PATENT DOCUMENTS

| | | | | |
|---|---|---|---|---|
| 5,555,302 | A * | 9/1996 | Wang | B60R 11/0241 379/426 |
| 7,407,143 | B1 * | 8/2008 | Chen | B60R 11/0241 248/316.4 |
| 7,425,112 | B2 * | 9/2008 | Nowak, Jr. | F16B 23/0069 411/910 |
| 8,490,937 | B2 * | 7/2013 | Crain | F16M 11/041 248/316.4 |
| 2006/0215836 | A1 * | 9/2006 | Wang | H04M 1/04 379/455 |
| 2015/0313026 | A1 | 10/2015 | Yu | |
| 2016/0215527 | A1 | 7/2016 | Steinkamp | |
| 2016/0369531 | A1 | 12/2016 | Hommel | |
| 2017/0267305 | A1 * | 9/2017 | Muller | F16B 2/10 |
| 2018/0094892 | A1 * | 4/2018 | Bowe, Jr. | F41A 23/18 |
| 2018/0252358 | A1 | 9/2018 | Yang | |
| 2018/0354574 | A1 * | 12/2018 | Müller | E05B 71/00 |

FOREIGN PATENT DOCUMENTS

| | | | |
|---|---|---|---|
| CN | 106347538 A | 1/2017 | |
| CN | 106888297 A * | 6/2017 | B60R 11/02 |
| CN | 208739168 U | 4/2019 | |
| KR | 101717019 B1 | 3/2017 | |

OTHER PUBLICATIONS

Written Opinion of the International Searching Authority; International Searching Authority; International Application No. PCT/US2019/049278; Nov. 25, 2019; 5 pages.
Supplementary European Search Report; European Patent Office; Application No. EP19944080; Apr. 28, 2023; 2 pages.
European Written Opinion; European Patent Office; Application No. EP19944080; Apr. 28, 2023; 7 pages.
Chinese Office Action; China National Intellectual Property Administration; Chinese Patent Application No. 201980101947.2; Jun. 3, 2023; 10 pages.

* cited by examiner

BICYCLE LOCK MOUNTING BRACKET

CROSS REFERENCE TO RELATED APPLICATIONS

This application is a U.S. national stage filing of International Patent Application No. PCT/US2019/049278 filed Sep. 3, 2019, the contents of which are hereby incorporated by reference in their entirety.

TECHNICAL FIELD

The present disclosure generally relates to bicycle locks, and more particularly but not exclusively relates to brackets for mounting such locks to bicycles.

BACKGROUND

Bicycle locks are commonly used to secure a bicycle to a stationary object to prevent theft of the bicycle. In order to facilitate convenient storage of the lock, the frame of the bicycle may have mounted thereon a bracket by which the lock can be releasably secured to the frame. However, certain conventional mounting brackets suffer from certain limitations, such as those related to ease of use, failing to reliably secure the lock in a seated position, rattling of the lock while the bicycle is being ridden, and others. For these reasons among others, there remains a need for further improvements in this technological field.

SUMMARY

An exemplary mounting bracket is configured for releasably securing a bicycle lock to a bicycle, and generally includes a housing, a pair of opposing arms, a pinion, a latch, and a manual actuator. The arms are movably mounted to the housing for movement between inward positions and outward positions, and each arm includes a rack gear. The pinion is engaged with each rack gear and correlates movement of the arms such that the arms move with one another between the outward positions and the inward positions. The latch has a latching position in which the latch is operable to maintain the arms in the inward position, and has an unlatching position in which the arms are free to move from the inward position to the outward position. The manual actuator is operable to move the latch between the latching position and the unlatching position. Further embodiments, forms, features, and aspects of the present application shall become apparent from the description and figures provided herewith.

DETAILED DESCRIPTION OF ILLUSTRATIVE EMBODIMENTS

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" are used to denote motion or spacing along three mutually perpendicular axes, wherein each of the axes defines two opposite directions. In the coordinate system illustrated in FIG. 1, the X-axis defines first and second longitudinal directions (also referred to herein as the proximal and distal directions), the Y-axis defines first and second lateral directions, and the Z-axis defines first and second transverse directions. These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. Similarly, a movement that is described as comprising lateral movement may or may not include movement in a transverse direction and/or movement in a longitudinal direction. The terms are therefore not to be construed as limiting the scope of the subject matter described herein to any particular arrangement unless specified to the contrary.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

Figure 1:
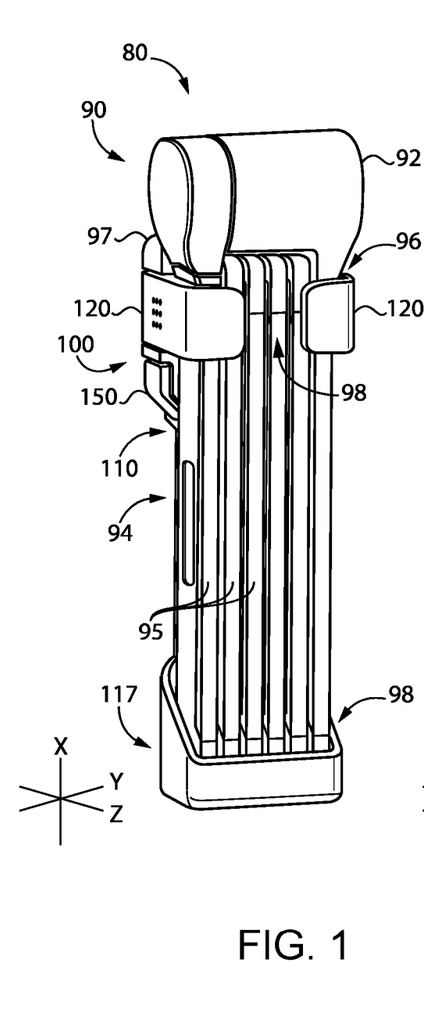
FIG. 1 is a perspective view of a lock/bracket assembly including a bicycle lock and a mounting bracket according to certain embodiments.

With reference to FIG. 1, illustrated therein is a lock/bracket assembly 80 according to certain embodiments. The lock/bracket assembly 80 includes a lock 90 and a mounting bracket 100 according to certain embodiments. While other forms are contemplated, the illustrated lock 90 is provided as a folding lock including a lock head 92 and a foldable linkage 94. The linkage 94 includes a plurality of links 95 that are pivotably coupled to one another. The linkage 94 has a first end 96 coupled to the lock head 92 and an opposite second end 97 operable to selectively engage the lock head 92 to form a closed loop such that the lock 90 is operable to secure a bicycle to a stationary object. The lock 90 may be provided as any form of folding lock known in the art, and need not be described in further detail herein.

Figure 2:
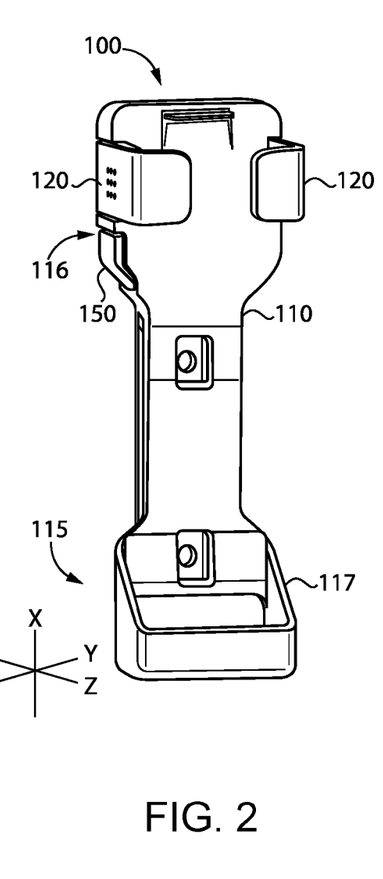
FIG. 2 is a perspective view of the mounting bracket in a holding state.
Figure 3:
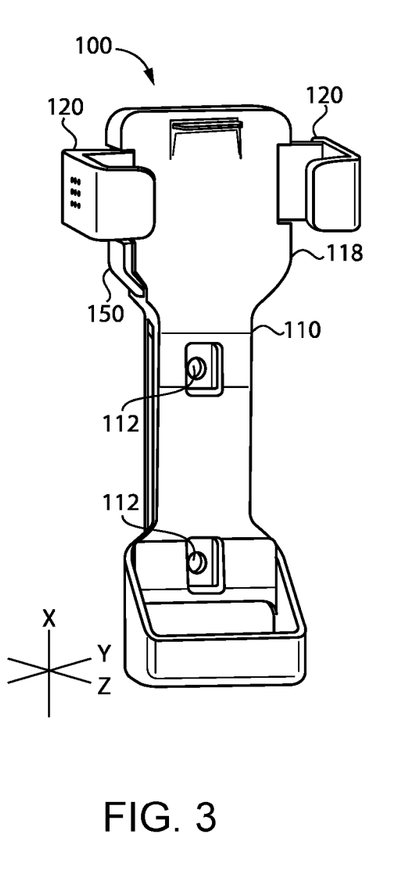
FIG. 3 is a perspective view of the mounting bracket in a releasing state.

With additional reference to FIGS. 2 and 3, the mounting bracket 100 includes a housing 110 and a pair of arms 120 movably mounted to the housing 110. The housing 110 extends along a longitudinal axis 111, and the arms 120 are laterally movable between laterally inward holding positions defining a holding state for the bracket 100 (FIG. 2) and laterally outward releasing positions defining a releasing state for the bracket 100 (FIG. 3). The bracket 100 is operable to retain the lock 90 in a seated position when in the holding state, and is configured to release the lock 90 from the seated position when in the releasing state. As described herein, the bracket 100 includes features that selectively retain the bracket 100 in the holding state such that the bracket 100 can be used to store and carry the lock 90 along with the bicycle to which the bracket 100 is mounted.

Figure 4:
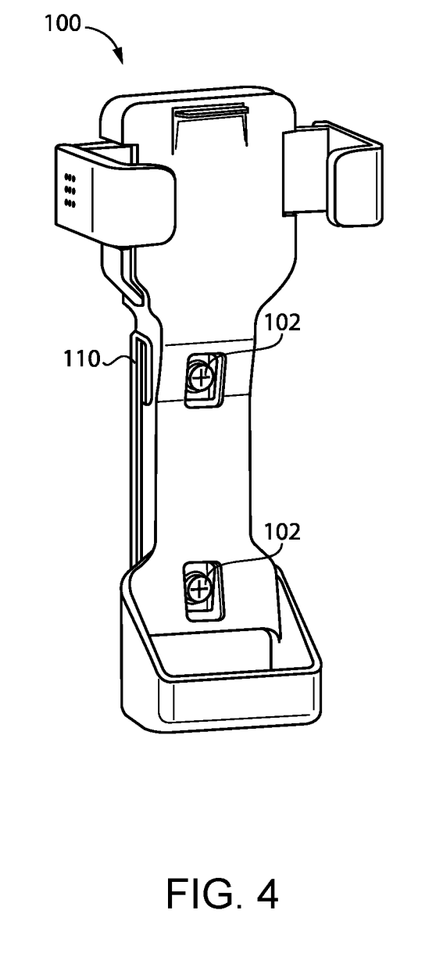
FIG. 4 is a perspective view of the mounting bracket including fasteners for securing the bracket to the frame of a bicycle.
Figure 5:
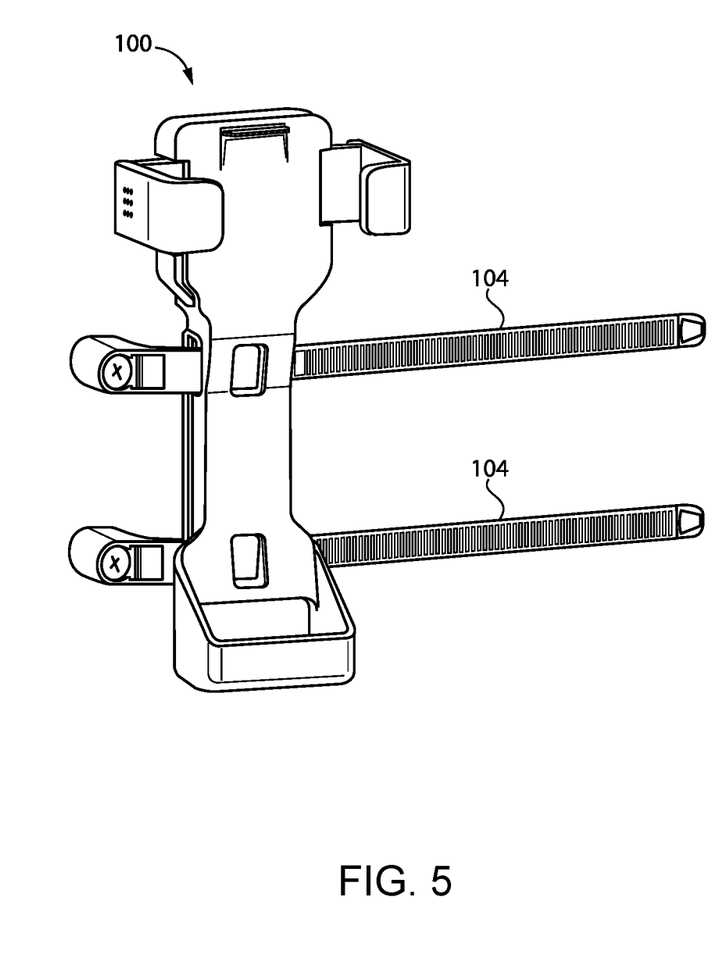
FIG. 5 is a perspective view of the mounting bracket including straps for securing the bracket to the frame of a bicycle.
Figure 15:
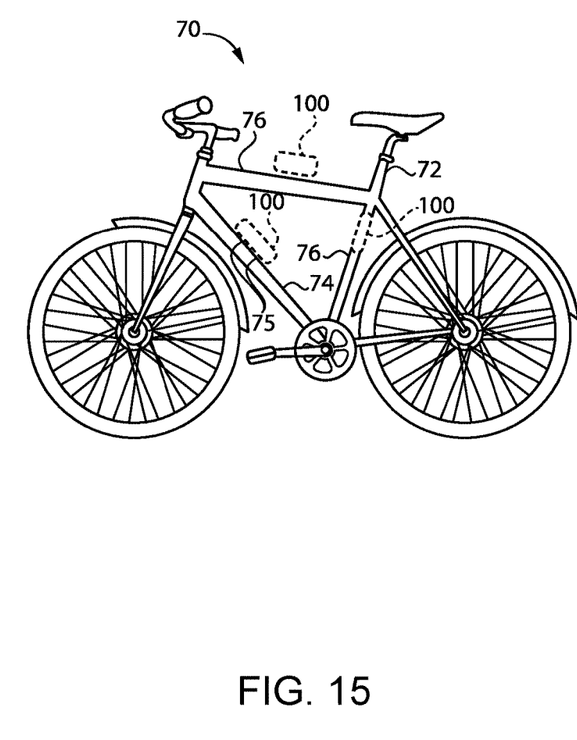
FIG. 15 is a schematic illustration of a bicycle having the lock/bracket assembly of FIG. 1 mounted thereon.

With additional reference to FIGS. 4, 5 and 15, the bracket 100 may include one or more mechanisms by which the bracket 100 can be mounted to a bicycle 70. In certain embodiments, the housing 110 may include a pair of mounting apertures 112, and the bracket 100 may include a pair of fasteners such as mounting screws 102 for securing the bracket 100 to the bicycle 70. The apertures 112 may be spaced apart by a distance corresponding to the distance between a second pair of apertures 75 formed in the bicycle frame 72 to facilitate mounting of the bracket 100 to the frame 72 via the fasteners 102. In certain embodiments, the bracket 100 may include one or more straps 104 by which the bracket 100 can be secured to the bicycle frame 72. In certain forms, the bracket 100 may include both the apertures 112 and the straps 104 to provide multiple mounting options for the bracket 100. In such forms, the straps 104 may be removable such that removal of the straps 104 exposes the apertures 112. Further details regarding the mounting of the bracket 100 to the bicycle 70 are provided below with reference to FIG. 15.

Figure 6:
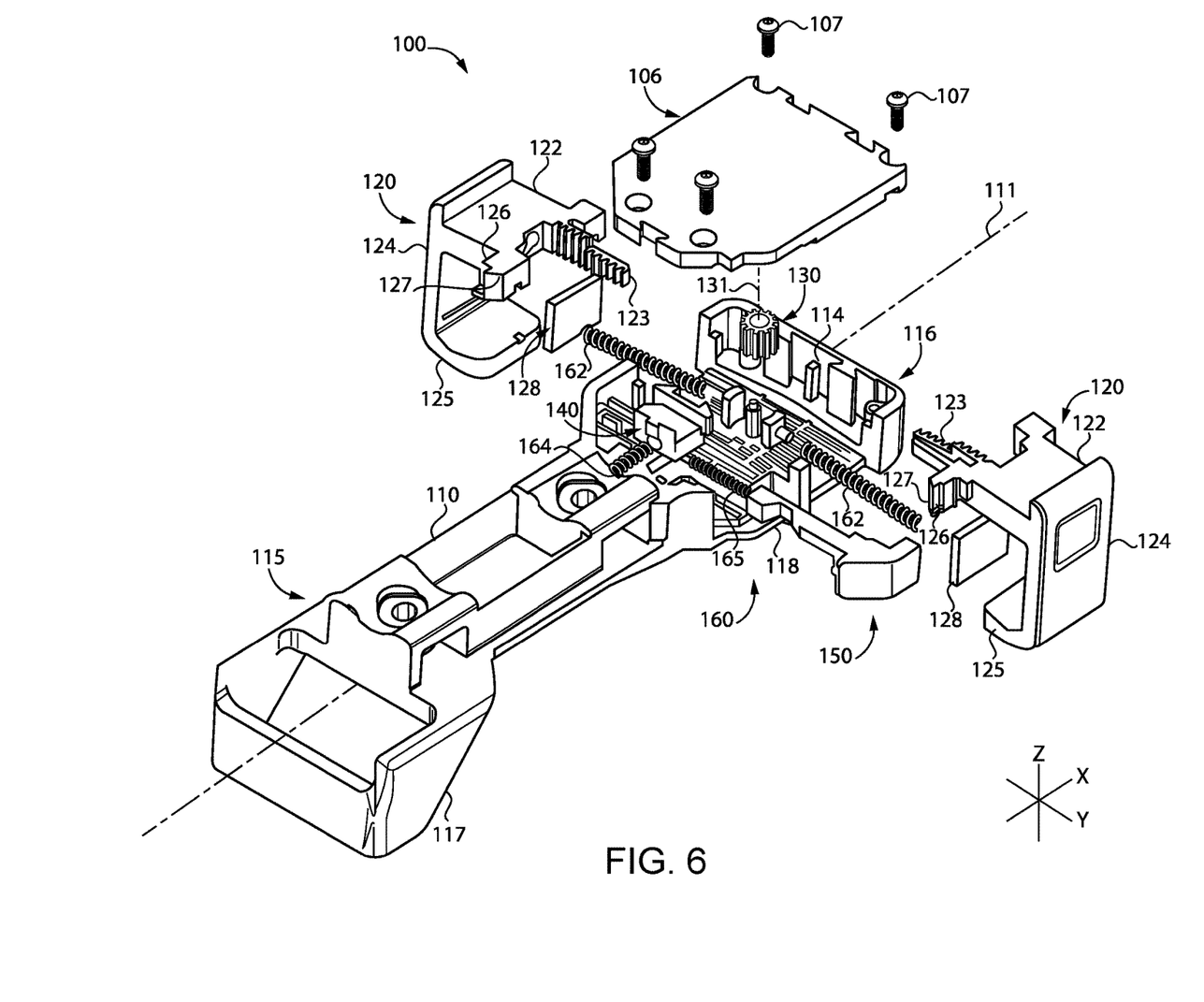
FIG. 6 is an exploded assembly view of the mounting bracket.

With additional reference to FIG. 6, the mounting bracket 100 generally includes the housing 110, the pair of arms 120, a pinion 130 engaged with the arms 120, a latch 140 movably mounted to the housing 110 and operable to engage the arms 120, a manual actuator 150 operable to move the latch 140 between a latching position and an unlatching position, and a biasing assembly 160 urging various elements of the bracket 100 toward biased positions. As described herein, the pinion 130 is configured to correlate movement of the arms 120 such that the arms 120 move in unison between the outer positions thereof and the inner positions thereof, and the latch 140 is configured to selectively retain the arms 120 in the inner positions thereof.

The housing 110 extends along the longitudinal axis 111, and includes a distal first end 115 and a proximal second end 116. The front portion of the distal first end 115 defines a basket 117 sized and shaped to receive a first portion 98 of the lock 90, and the rear portion of the proximal second end 116 defines a chamber 114 in which the pinion 130 is rotatably mounted. A base plate 118 of the housing 110 extends along a longitudinal-lateral base plane 119 (FIGS. 11 and 12) that runs parallel to and/or includes the longitudinal axis 111 and a lateral (Y) axis. A cover 106 is secured to the rear of the housing 110 and encloses the chamber 114. In the illustrated embodiment, the cover 106 is secured to the housing 110 by one or more fastener screws 107 that, as described herein, may be tamper-resistant. In other embodiments, the fastener screws 107 may not necessarily be tamper-resistant, or may be omitted. For example, the cover 106 may be secured to the housing 110 by other fastening mechanisms, such as one or more clips, one or more rivets, one or more adhesives, and/or other forms of conventional fastening mechanisms.

Figure 7:
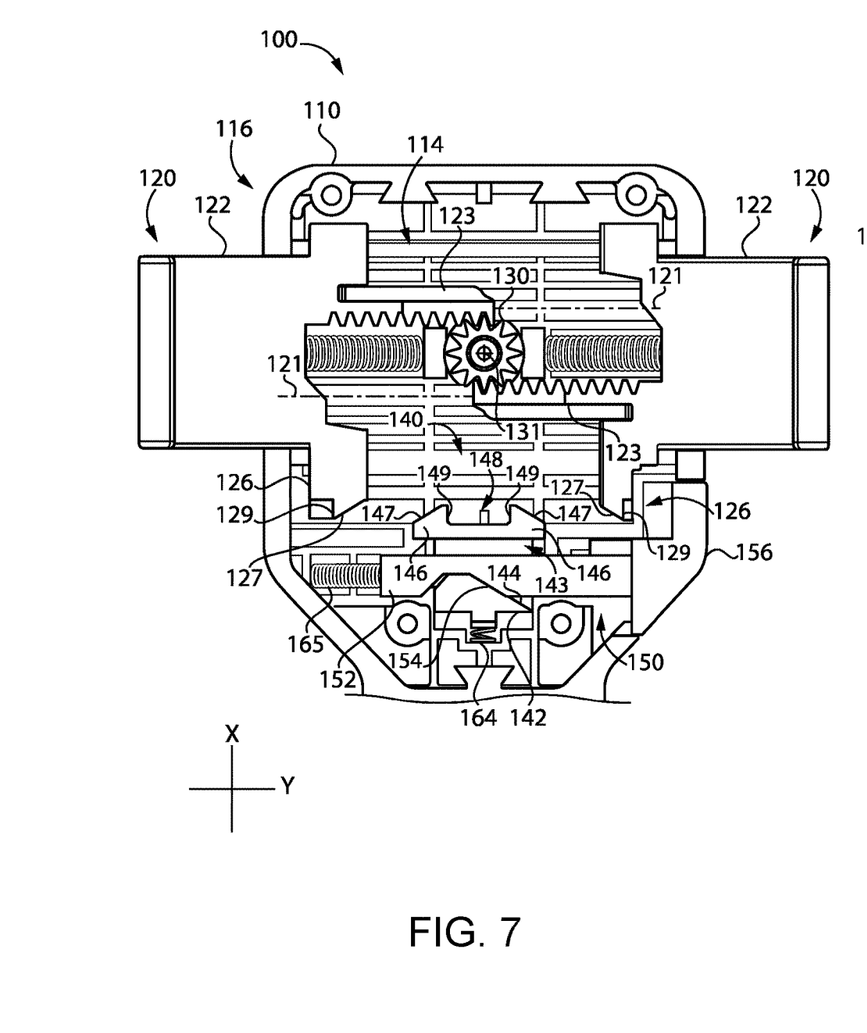
FIG. 7 is a plan view of the mounting bracket in the releasing state.
Figure 10:
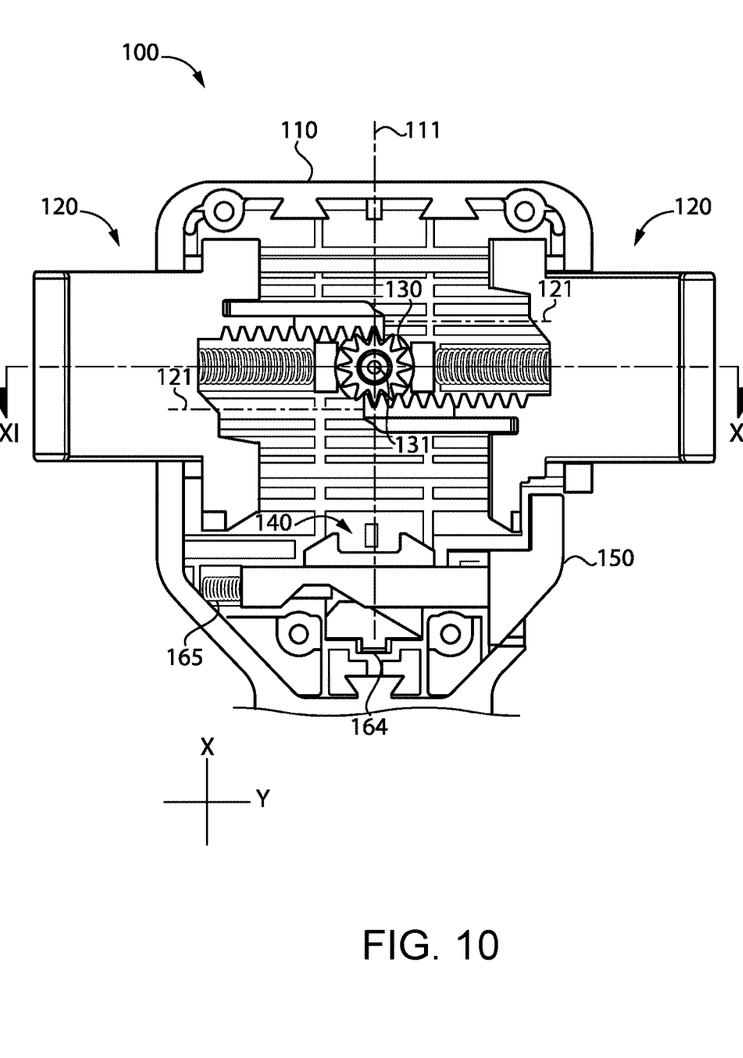
FIG. 10 is a plan view of the mounting bracket in the releasing state.

The arms 120 are movably mounted to the housing 110 and positioned partially within the chamber 114. Each of the arms 120 includes a base portion 122 extending into the chamber 114, a rack gear 123 extending from the base portion 122 and engaged with the pinion 130, an engagement portion 124 extending transversely from the laterally outward side of the base portion 122 and beyond the front face of the base plate 118, and a retention flange 125 extending laterally from the engagement portion 124 toward the other of the arms 120. Each of the arms 120 further includes a projection 126 operable to engage the latch 140, and one or both of the projections 126 may include a ramp 127 formed on the laterally inward side thereof and/or a shoulder 129 formed on the laterally outward side thereof. Each engagement portion 124 may include a pad 128 that cushions engagement of the engagement portion 124 with the lock 90. As illustrated in FIGS. 7 and 10, each rack gear 123 extends along a corresponding and respective lateral axis 121, and the lateral axes 121 are positioned on opposite sides of a transverse axis 131 about which the pinion 130 rotates.

Figure 8:
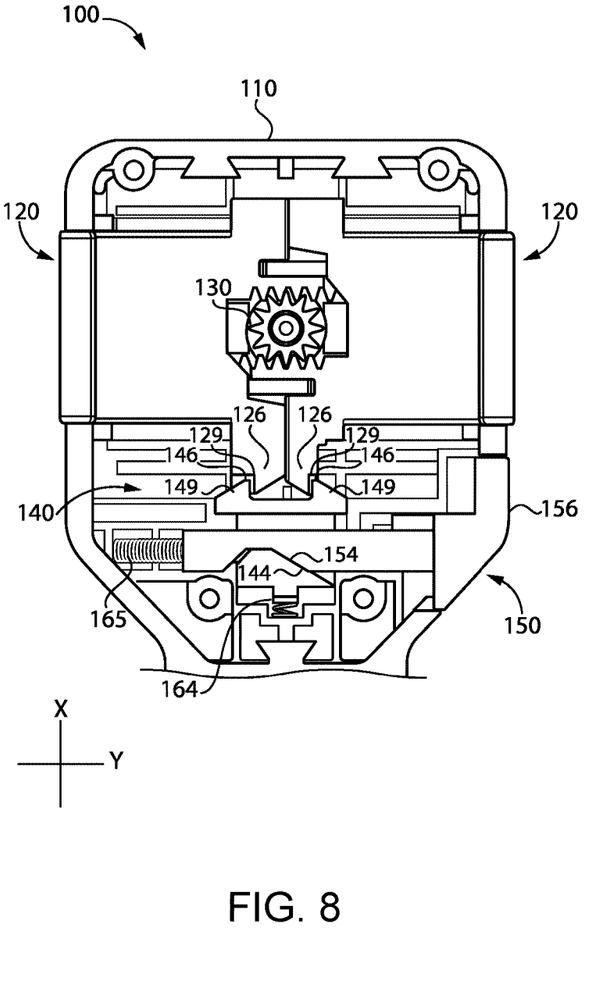
FIG. 8 is a plan view of the mounting bracket in the holding state.

With additional reference to FIGS. 7 and 8, the arms 120 are laterally movable relative to the housing 110 between laterally outward releasing positions (FIG. 7) and laterally inward holding positions (FIG. 8). As used herein, the term "laterally inward" may be used to refer to a position that is closer to the central longitudinal axis 111 along which the housing 110 extends, and/or to directions that extend toward the longitudinal axis 111. Conversely, the term "laterally outward" may be used to refer to a position that is farther from the longitudinal axis 111, and/or to directions that extend away from the longitudinal axis 111. In the illustrated form, the laterally outward direction and the laterally inward direction may equivalently be defined as movement away from and toward the transverse axis 131 about which the pinion 130 rotates, or movement away from and toward a longitudinal-transverse (X-Z) plane including the longitudinal axis 111 and the transverse axis 131. Thus, in the orientation illustrated in FIGS. 7 and 8, "laterally outward" refers to a leftward position or direction for the left arm 120 and a rightward position or direction for the right arm 120, while "laterally inward" refers to a rightward position or direction for the left arm 120 and a leftward position or direction for the right arm 120. As described herein, the arms 120 may further be mounted for transverse movement between the laterally outward position and the laterally inward position such that the position of the arms 120 along the transverse (Z) axis 131 alters as the arms 120 move between the laterally inward and laterally outward positions thereof.

The pinion 130 is rotatably mounted in the chamber 114 for rotation about a transverse rotational axis 131, and is engaged with the rack gears 123 such that the arms 120 are operationally coupled for joint movement in the laterally inward and laterally outward directions. Stated another way, the pinion 130 correlates movement of the arms 120 such that movement of one arm causes a corresponding movement of the other arm 120. More particularly, laterally inward movement of either arm 120 will cause laterally inward movement of the other arm 120, and laterally outward movement of either arm 120 will cause laterally outward movement of the other arm 120.

In the illustrated form, the pinion 130 is mounted for rotation about the transverse axis 131, and the rack gears 123 are engaged with the pinion 130 on opposite sides of the transverse axis 131 such that the lateral axes 121 are positioned on opposite sides of the transverse axis 131. As a result, rotation of the pinion 130 in a first direction (clockwise in FIGS. 7 and 8) is correlated with laterally inward motion of the arms 120, and rotation of the pinion 130 in an opposite second direction (counter-clockwise in FIGS. 7 and 8) is correlated with laterally outward motion of the arms 120. It is also contemplated that the pinion 130 may be mounted for rotation about a longitudinal axis such as the longitudinal axis 111, and that the rack gears 123 may be engaged with the pinion 130 on opposite sides of such a longitudinal axis.

The latch 140 generally includes a body portion 142 defining a cavity 143, a first latch ramp 144 defined in the cavity 143, and a pair of proximally-extending projections 146 having a recess 148 defined therebetween. The laterally outward side of each projection 146 includes a corresponding and respective second latch ramp 147, and the laterally inward side of each projection 146 includes a shoulder 149 that partially defines the recess 148. As described herein, the latch projections 146 are operable to engage the arm projections 126 to selectively retain the arms 120 in the laterally inward positions thereof. Additionally, the latch 140 has a latching position (FIGS. 7 and 8) and an unlatching position (FIGS. 9 and 10), and is mounted for longitudinal movement between the latching and unlatching positions.

The manual actuator 150 generally includes a stem 152 extending through the cavity 143, an actuating ramp 154 defined on the stem 152 and engaged with the first latch ramp 144, and a manually-engageable portion 156 accessible from outside the housing 110. As described herein, the actuator 150 has a deactuating position (FIGS. 7 and 8) and an actuating position (FIGS. 9 and 10), and in the illustrated form is mounted for lateral movement between the actuating position and the deactuating position.

The biasing assembly 160 includes several biasing mechanisms, each of which urges a corresponding and respective component of the bracket 100 to a biased position. In the illustrated form, the biasing assembly 160 includes an arm biasing mechanism 162, a latch biasing mechanism 164, and an actuator biasing mechanism 165. The arm biasing mechanism 162 is engaged between the housing 110 and at least one of the arms 120, and biases the arms 120 to their laterally outward releasing positions. The latch biasing mechanism 164 is engaged between the housing 110 and the latch 140, and biases the latch 140 toward its latching position. The actuator biasing mechanism 165 is engaged between the housing 110 and the stem 152 of the manual actuator 150, and biases the actuator 150 toward its deactuating position. In the illustrated form, each of the biasing mechanisms 162, 164, 165 includes at least one compression spring. More particularly, the arm biasing mechanism 162 includes a pair of compression springs, and each of the latch biasing mechanism 164 and the actuator biasing mechanism 165 includes a corresponding and respective compression spring. In other embodiments, one or more of the biasing mechanisms 162, 164, 165 may be provided in another form, such as a form including a torsion spring, a leaf spring, an extension spring, an elastic member, and/or magnets.

In use, the bracket 100 is operable to releasably secure the lock 90 to the bicycle frame 72 to which the bracket 100 is mounted (e.g., by the screws 102 and/or the straps 104). With the bracket 100 mounted to the frame 72, a method of using the bracket 100 may begin with the bracket 100 in the releasing state (FIG. 7), in which the arms 120 are in the laterally outward positions to which they are biased by the arm biasing mechanism 162. In this state, the lateral distance between the retention flanges 125 may be greater than the lateral width of the folded linkage 94 such that, with the bottom portion 98 of the folded linkage 94 seated in the basket 117, the folding lock 90 can be pivoted between a removal position in which a second portion 99 of the folded linkage 94 is positioned outside the grasp of the arms 120 and a seated position in which the second portion 99 of the folded linkage 94 is positioned between the engagement portions 124.

In order to secure the lock 90 to the bracket 100, the user may urge one or both of the arms 120 laterally inward toward the holding positions thereof to transition the bracket from the releasing state (FIG. 7) to the holding state (FIG. 8). As the user does so, the pinion 130 correlates the movement of the arms 120 such that the arms 120 move in unison toward the inward holding positions, in which the flanges 125 partially cover the second portion 99 of the folded linkage 94. As the arms 120 approach their holding positions, the ramps 127 of the arm projections 126 engage the ramps 147 of the latch projections 146, thereby driving the latch 140 toward its unlatching position against the urging of the latch biasing mechanism 164. When the arms 120 reach their holding positions, the arm projections 126 clear the latch projections 146, and the latch biasing mechanism 164 drives the latch 140 to its latching position such that the arm projections 126 enter the recess 148. In this state (FIG. 8), the latch shoulders 149 engage the arm shoulders 129 and retain the arms 120 in their laterally inward holding positions against the laterally outward biasing force of the arm biasing mechanism 162.

In the illustrated form, the latch 140 includes two second ramps 147, each of which engages a corresponding one of the two arm ramps 127. It is also contemplated that other arrangements may be utilized to drive the latch 140 from the latching position to the unlatching position as the arms 120 move toward the inward holding positions. For example, in certain embodiments, the latch 140 may include a single latch ramp 147 that is engaged by only one of the arms 120, or only one of the arms 120 may include an arm ramp 127. In any event, it is preferred that the interface between the arms 120 and the latch 140 include at least one ramp by which lateral motion of the arms 120 toward the inward holding positions is translated to longitudinal movement of the latch 140 toward the unlatching position.

Additionally, while the illustrated latch 140 directly engages each arm 120 to retain the arms 120 in the inward holding positions, it is also contemplated that the latch 140 may engage a single one of the arms 120. In such forms, the other of the arms 120 may be retained in the inward holding position by engagement of the pinion 130 with the rack gears 123. In order to increase the holding force, however, it may be preferable to have the latch 140 engage each of the arms 120 so as to avoid putting additional strain on the pinion 130.

With the bracket 100 in the holding state, the engagement portions 124 are engaged with the sides of the lock 90 and restrain the lock 90 from lateral movement, thereby inhibiting rattling of the lock 90 against the bracket 100. Such rattling may be further inhibited by mounting the arms 120 for transverse movement relative to the base plate 118, for example as described below with reference to FIGS. 11 and 12. Additionally, with the flanges 125 partially covering the folded linkage 94, the arms 120 prevent pivoting of the lock 90 about the bottom portion 98 of the folded linkage 94, thereby retaining the lock 90 in the seated position.

Figure 9:
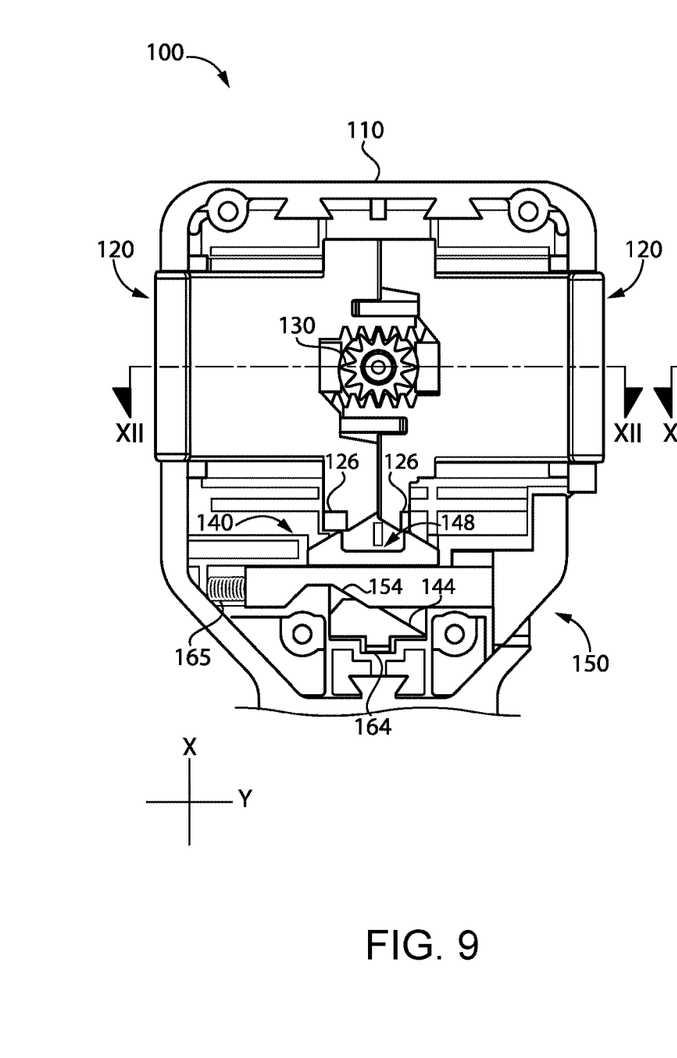
FIG. 9 is a plan view of the mounting bracket transitioning from the holding state to the releasing state.

With additional reference to FIGS. 9 and 10, in order to remove the lock 90, the user may transition the bracket 100 from the holding state to the releasing state by depressing the manual actuator 150 against the force of the actuator biasing mechanism 165. As the actuator 150 moves from its deactuating position (FIG. 8) to its actuating position (FIG. 9), engagement between the first latch ramp 144 and the actuator ramp 154 drives the latch 140 from its latching position toward its unlatching position. In other words, the ramps 144, 154 translate the lateral movement of the actuator 150 into longitudinal movement of the latch 140.

As the latch 140 moves to its unlatching position, the arm projections 126 disengage from the latch projections 146 and exit the recess 148. As the arm shoulders 129 clear the latch shoulders 149, the arm biasing mechanism 162 drives the arms 120 laterally outward from the holding positions (FIG. 9) to the releasing positions (FIG. 10). When the arms 120 have returned to the outward releasing positions, the bracket 100 is once again in the releasing state, in which the lock 90 can be easily removed. When the user releases the manual actuator 150, the actuator biasing mechanism 165 returns the actuator 150 to its deactuating position, and the latch biasing mechanism 164 returns the latch 140 to the latching position.

In the illustrated form, the manual actuator 150 is engaged with the latch 140 via ramps 144, 154 such that lateral movement of actuator 150 between its deactuating position and its actuating position causes longitudinal movement of latch 140 between its latching position and its unlatching position. It is also contemplated that the manual actuator 150 may drive the latch 140 from the latching position to the unlatching position in another manner. For example, an actuator may be provided as a lever that drives the latch 140 to the unlatching position when the lever is moved longitudinally or transversely and/or is pivoted by the user.

In the illustrated embodiment, the arms 120 are automatically driven to the outward holding positions by the arm biasing mechanism 162 when the manual actuator 150 is actuated. It is also contemplated that the arm biasing mechanism 162 may be omitted, in which case the user may need to manually move the arms 120 to the outward positions upon actuating the manual actuator 150.

Figure 11:
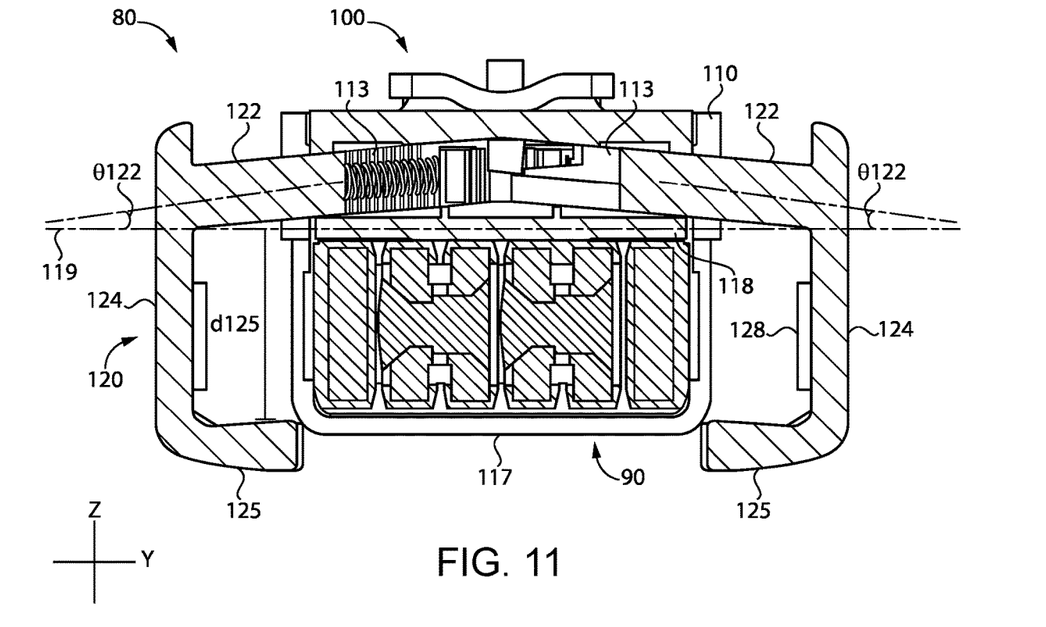
FIG. 11 is a cross-sectional view of the assembly of FIG. 1 with the mounting bracket in the releasing state, and is taken along the cross-section line XI-XI illustrated in FIG. 10.
Figure 12:
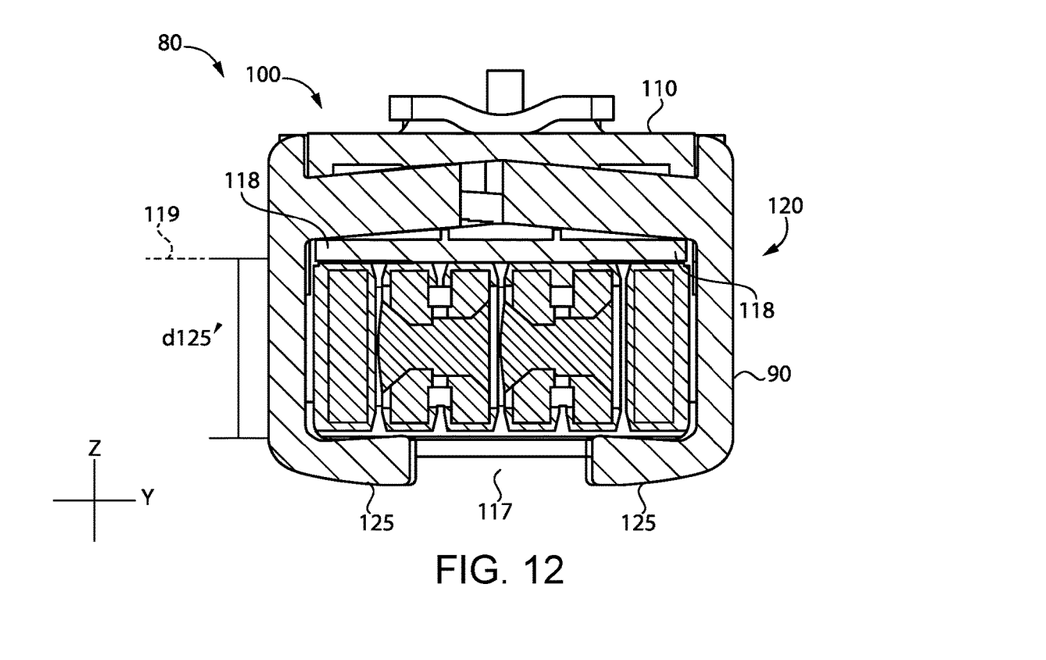
FIG. 12 is a cross-sectional view of the assembly of FIG. 1 with the mounting bracket in the holding state, and is taken along the cross-section line XII-XII illustrated in FIG. 9.

With additional reference to FIGS. 11 and 12, the arms 120 may be configured to move transversely relative to the base plate 118 to aid in securing the lock 90 to the bracket 100. For example, the base portion 122 of each arm 120 may extend at an oblique angle θ122 relative to the base plane 119 defined by the base plate 118, and the housing 110 may include oblique channels 113 that slidably receive the base portions 122. In such forms, the arms 120 may slide obliquely in the transverse (Z) direction as the arms 120 move between the outer positions (FIG. 11) and the inner positions (FIG. 12). More particularly, the obliquely-angled channels 113 and base portions 122 are arranged such that the flanges 125 move toward the base plate 118 as the arms move between the releasing positions and the holding positions such that a first offset distance d125 defined between the retention flanges 125 and the base plane 119 when the arms 120 are in the outer releasing positions (FIG. 11) is greater than a second offset distance d125' defined between the retention flanges 125 and the base plane 119 when the arms 120 are in the inner holding positions (FIG. 12). This reduction in the offset distance provides an additional clamping force that aids in retaining the lock 90 in the seated position, and may further aid in reducing rattling when the bicycle is being ridden. While other angles θ122 are contemplated, the oblique angle θ122 of the illustrated embodiments is an angle less than 10°, such as an angle of about 5°.

As should be evident from the foregoing, in the illustrated form, the outward releasing position is both a laterally outward position and a transversely outward position, while the inward holding position is both a laterally inward position and a transversely inward position. Thus, the arms 120 of the illustrated embodiment are mounted for both lateral and transverse movement between the inward and outward positions thereof. It is also contemplated that the arms 120 may be mounted for movement parallel to the lateral (Y) axis such that the oblique angle θ122 is replaced with an angle of 0°. It is further contemplated that the arms 120 may move along a curvilinear path instead of a rectilinear path to achieve the first and second offset distances d125, d125' when the arms 120 are in the outer and inner positions.

Figure 13:
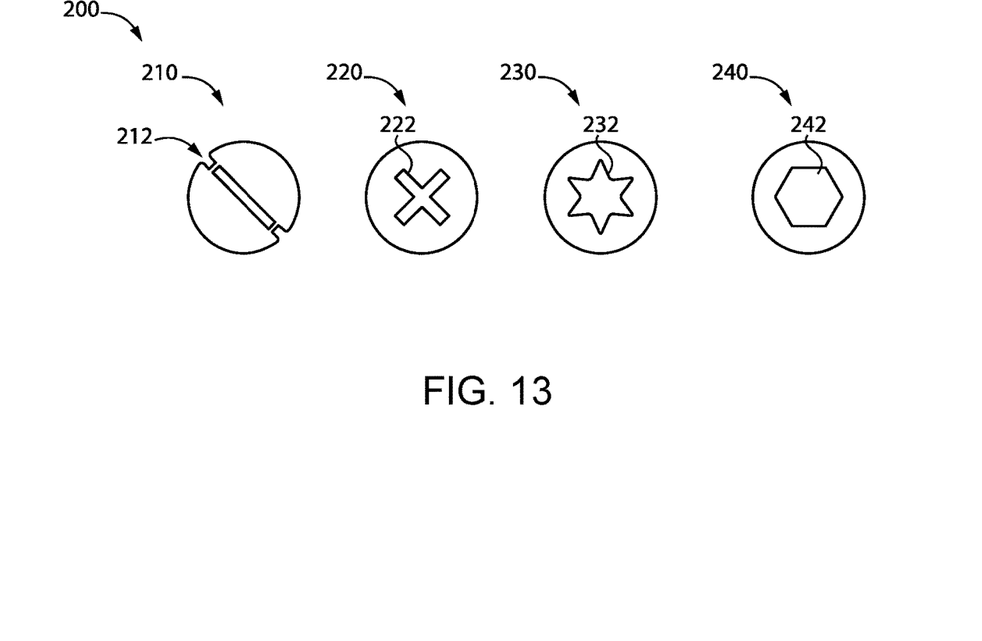
FIG. 13 illustrates several non-tamper-resistant screw heads.
Figure 14:
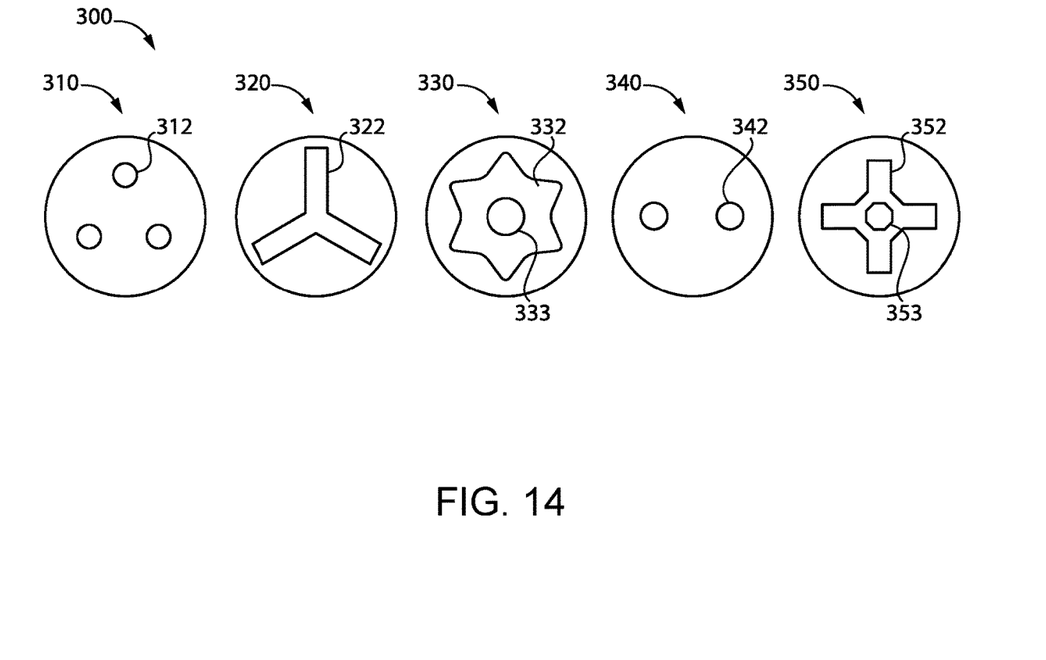
FIG. 14 illustrates several tamper-resistant screw heads.

With additional reference to FIGS. 13 and 14, illustrated therein are schematic representations of various screw heads that may be utilized in connection with the above-described fastener screws 107. In certain forms, the heads of the fastener screws 107 may be provided as conventional screw heads 200 having an industry-standard configuration, such as those illustrated in FIG. 13. As one example, one or more of the fastener screws 107 may be provided with a conventional flathead screwdriver head 210, in which the tool-receiving recess 212 is provided in the form of a straight slot. As another example, one or more of the fastener screws 107 may be provided with a conventional Phillips-head screwdriver head 220, in which the tool-receiving recess 222 is provided in the form of a hollow cross. As another example, one or more of the fastener screws 107 may be provided with a conventional star head 230, in which the tool-receiving recess 232 is provided in the form of a hollow star shape. As another example, one or more of the fastener screws 107 may be provided with a conventional hex head 240, in which the tool-receiving recess 242 is provided in the form of a hollow hexagon.

Each of the screw heads 200 illustrated in FIG. 13 is fairly common in the industry, and it would not be atypical for a user to have a tool (e.g., a flathead screwdriver or bit, a Phillips head screwdriver or bit, a star head screwdriver or bit, or a hexagonal screwdriver or bit) by which the fastener screws 107 could be removed. In certain circumstances, however, it may be desirable to discourage the user from opening the chamber 114. Accordingly, the fastening screws 107 may be provided with a tamper resistant screw head 300, such as those illustrated in FIG. 14.

As one example, one or more of the fastener screws 107 may be provided with a tamper-resistant head 310 in which the tool-receiving recess 312 is provided in the form of three dimples arranged in a triangular arrangement. In certain forms, one or more of the fastener screws 107 may be provided with a tamper-resistant head 320 in which the tool-receiving recess 322 is provided in the form of three intersecting channels angularly spaced 120° apart from one another. In certain forms, one or more of the fastener screws 107 may be provided with a tamper-resistant head 330 in which the tool-receiving recess 332 is provided in the form of a non-hollow star shape having a projection 333 formed therein. In certain forms, one or more of the fastener screws 107 may be provided with a tamper-resistant head 340 in which the tool-receiving recess 342 is provided in the form of two dimples arranged in a snake-eye pattern. In certain forms, one or more of the fastener screws 107 may be provided with a tamper-resistant head 350 in which the tool-receiving recess 352 is provided in the form of a non-hollow cross having a projection 353 formed therein.

As will be appreciated, each of the tamper-resistant screw heads 300 illustrated in FIG. 14 is much less common than the industry-standard conventional screw heads 200 illustrated in FIG. 13. It is therefore much less likely for a user to have access to the tools by which a fastening screw 107 including one of the tamper-resistant screw heads 300 could be removed. The inclusion of a tamper-resistant screw-head such as those illustrated in FIG. 14 may discourage the user from opening the chamber 114 and tampering with the internal components seated therein. While certain examples of tamper-resistant screw heads 300 are illustrated in FIG. 14, it is to be appreciated that other forms of tamper-resistant screw heads may be utilized. Such tamper resistant screw heads will typically have a tool-receiving recess that is neither slot shaped, nor hollow-cross shaped, nor hollow-star shaped, nor hollow-hexagon shaped.

With additional reference to FIG. 15, illustrated therein is a bicycle 70 that may be utilized in connection with the lock/bracket assembly 80. The bicycle 70 includes a frame 72 to which the bracket 100 may be mounted. The frame 72 includes a strut 74 having formed therein a pair of mounting apertures 75. The mounting apertures 112 of the housing 110 are spaced apart by a distance corresponding to the distance between the frame mounting apertures 75 such that the fasteners 102 can engage the mounting apertures 75 to secure the bracket 100 to the frame 72. Additionally or alternatively, the bracket 100 may be mounted to the strut 74 or another strut 76 in another manner, for example by using the straps 104.

Figure 16:
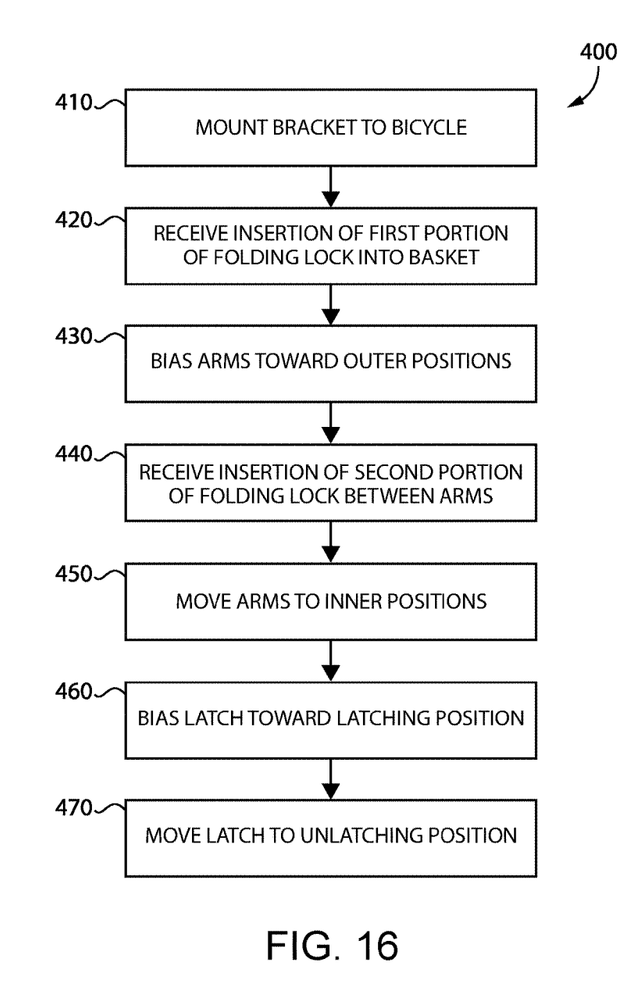
FIG. 16 is a schematic flow diagram of a process according to certain embodiments.

With additional reference to FIG. 16, illustrated therein is a process 400 that may be performed using the lock/bracket assembly 80. Blocks illustrated for the process 400 are understood to be examples only, and blocks may be combined or divided, and added or removed, as well as reordered in whole or in part, unless explicitly stated to the contrary. Unless specified to the contrary, it is contemplated that certain blocks performed in the process 400 may be performed wholly by the bracket 100 and/or a user, or that the blocks may be distributed among the bracket 100 and the user. Additionally, while the blocks are illustrated in a relatively serial fashion, it is to be understood that two or more of the blocks may be performed concurrently or in parallel with one another. Furthermore, while the process 400 is described with specific reference to the folding lock 90 and the bracket 100 illustrated in the figures, it is to be appreciated that the process 400 may be performed utilizing other forms of lock and/or bracket.

The process 400 may begin with block 410, which generally involves mounting the bracket 100 to the bicycle 70. Block 410 may, for example, involve mounting the bracket 100 to the strut 74 using the fasteners 102 and the mounting apertures 75, 112. Additionally or alternatively, block 410 may involve mounting the bracket 100 to one of the struts 74, 76 using the straps 104.

The process 400 generally includes block 420, which involves receiving insertion of a first portion 98 of the folding lock 90 into the basket 117. In certain forms, block 420 may be performed while the arms 120 are in the outer positions thereof, while in other embodiments, block 420 may be performed while the arms 120 are in the inner positions thereof.

The illustrated process 400 also includes block 430, which generally involves biasing the arms 120 to the outward releasing positions thereof. Block 430 may involve biasing the arms 120 to the outer positions thereof using an arm biasing mechanism 162, such as one or more compression springs. With the arms 120 in the outer releasing positions, the retention flanges 125 are separated from one another by a distance sufficient to permit insertion of the second portion 99 of the folding lock 90, and the process 400 may continue to block 440.

The process 400 also includes block 440, which is performed while the arms 120 are in the outer releasing positions, and which generally involves receiving insertion of the second portion 99 of the folding lock 90 between the arms 120 such that the second portion 99 is seated between the engagement portions 124. In this state, the rear side of the folding lock 90 is engaged with the base plate 118, and the retention flanges 125 are offset from the base plane 119 by the first transverse offset distance d125.

Following block 440, the process 400 may continue to block 450, which generally involves moving the arms 120 to the inner or holding positions thereof. Block 450 may, for example, involve correlating the movement of the arms 120 via the pinion 130 such that movement of either arm 120 toward its inner holding position causes movement of the other arm 120 toward its inner holding position. As the arms 120 travel toward the inner holding positions, the retention flanges 125 travel toward the base plate 118 and engage the front face of the folded linkage 94, thereby providing a clamping force that restricts transverse movement of the second portion 99. Additionally, the engagement portions 124 provide a lateral clamping force that restricts lateral movement of the second portion 99.

The process 400 also includes block 460, which generally involve biasing the latch 140 toward its latching position, for example by the latch biasing mechanism 164. In certain forms, the latch 140 may move against this biasing force to its unlatching position as a result of the arms 120 moving to the inner positions thereof in block 450, for example as described above with reference to FIGS. 7 and 8. In such forms, block 460 may involve returning the latch 140 to its latching position in response to the arms 120 reaching the inner holding positions thereof.

With the arms 120 in the inner holding positions and the latch 140 in the latching position, the bracket 100 is selectively retained in its holding state. As noted above, when the bracket 100 is in its holding state, the folding lock 90 is retained in its seated position by the basket 117 and the arms 120. Additionally, the bracket 100 can be moved from the holding position to the releasing position by operation of the manual actuator 150, for example as will now be described with reference to block 470.

The process 400 may further include block 470, which generally involves moving the bracket 100 from its holding state to its releasing state in response to actuation of the manual actuator 150. More particularly, block 470 involves moving the latch 140 from its latching position to its unlatching position in response to movement of the manual actuator 150 from its deactuating position to its actuating position. When the latch 140 reaches its unlatching position, the arm biasing mechanism 162 may drive the arms 120 to the outer releasing positions thereof. Alternatively, such as in forms in which the arm biasing mechanism 162 is omitted, the user may manually move the arms 120 to the outer releasing positions thereof. In either circumstance, the bracket 100 transitions to the releasing state, thereby permitting removal of the folding lock 90 from the bracket 100.

Certain embodiments of the present application relate to a mounting bracket 100 for a bicycle lock 90, the mounting bracket 100 comprising: a housing 110 defining a basket 117 sized and shaped to receive a first portion 98 of the bicycle lock 90; a pair of arms 120 operable to engage a second portion 99 of the bicycle lock 90, each arm 120 including a corresponding and respective rack gear 123; a pinion 130 engaged with the rack gears 123 such that the arms 120 move in unison between outward positions and inward positions; and a latch 140 operable to selectively retain the arms 120 in the inward positions, the latch 140 having a latching position in which the latch 140 is operable to retain the arms 120 in the inward positions and an unlatching position in which the latch 140 is inoperable to retain the arms 120 in the inward positions.

In certain embodiments, the bracket further comprises a manual actuator 150 operable to move the latch 140 between the latching position and the unlatching position. In certain embodiments the manual actuator 150 has a deactuating position and an actuating position, and the manual actuator 150 is configured to move the latch 140 from the latching position to the unlatching position as the manual actuator 150 moves from the deactuating position to the actuating position. In certain embodiments, the manual actuator 150 is biased toward the deactuating position by an actuator biasing mechanism 165. In certain embodiments, the latch 140 is mounted for longitudinal movement between the latching position and the unlatching position; and the manual actuator 150 is mounted for lateral movement between the deactuating position and the actuating position. In certain embodiments, the longitudinal movement is perpendicular to the lateral movement. In certain embodiments, the latch 140 includes a first ramp 144; the manual actuator 150 includes a second ramp 154; and the first ramp 144 and the second ramp 154 are configured to engage one another to translate lateral movement of the manual actuator 150 to longitudinal movement of the latch 140.

In certain embodiments, the arms 120 are configured to move at an oblique angle θ122 relative to the housing 110 between the outward positions and the inward positions. In certain embodiments, the oblique angle θ122 is less than 10°. In certain embodiments, the oblique angle θ122 is about 5°.

In certain embodiments, the housing 110 includes a base plate 118 operable to engage a rear side of the second portion 99 of the lock 90; each arm 120 includes a retention flange 125 extending toward the other arm 120 and configured to engage a front of the second portion 99 of the lock 90 when the arm 120 is in the inward position; each retention flange 125 is offset from the base plate 118 by a first offset distance d125 when the arms are in the outward positions; each retention flange 125 is offset from the base plate 118 by a second distance d125' when the arms 120 are in the inward positions; and the second distance d125' is less than the first distance d125.

In certain embodiments, the arms 120 are biased toward the outward positions by an arm biasing mechanism 162.

In certain embodiments, the latch 140 is biased toward the latching position by a latch biasing mechanism 164. In certain embodiments, the arms 120 are configured to move the latch 140 from the latching position to the unlatching position as the arms 120 travel from the outward positions to the inward positions; and the latch 140 is configured to return to the latching position when the arms 120 reach the inward positions. In certain embodiments, each arm 120 includes an arm ramp 127; the latch 140 includes a pair of latch ramps 147; and the arm ramps 127 are configured to engage the latch ramps 147 to drive the latch 140 toward the unlatching position as the arms 120 travel toward the inward positions.

In certain embodiments, the housing 110 defines a chamber 114 in which the pinion 130 is seated; and the bracket 100 further comprises a cover 106 that encloses the chamber 114. Certain embodiments further comprise a screw 107 securing the cover 106 to the housing 110, the screw 107 including a head 310, 320, 330, 340, 350 defining a tamper-resistant recess 312, 322, 332, 342, 352 that is neither slot shaped, nor hollow-cross shaped, nor hollow-star shaped, nor hollow-hexagon shaped.

In certain embodiments, a longitudinal axis 111 extends from the basket 117 to the pinion 130; the pinion 130 is rotatable about a transverse axis 131 perpendicular to the longitudinal axis 111; each rack gear 123 extends along a corresponding lateral axis 121 perpendicular to the longitudinal axis 111 and the transverse axis 131; and movement of the arms 120 between the outward positions and the inward positions comprises lateral movement of the arms 120. In certain embodiments, movement of the arms 120 between the outward positions and the inward positions further comprises transverse movement of the arms 120.

Certain embodiments of the present application relate to a lock/bracket assembly 80 comprising the bracket 100, further comprising the bicycle lock 90; wherein the bicycle lock 90 has a seated position in which the first portion 98 is seated in the basket 117 and the second portion 99 is positioned between the arms 120; wherein with the arms 120 in the inward positions, the bracket 100 retains the lock 90 in the seated position; and wherein with the arms 120 in the outward positions, the lock 90 can be removed from the seated position. In certain embodiments, the pinion 130 is rotatable about a transverse axis 131; each rack gear 123 extends along a corresponding lateral axis 121; each arm 120 includes a retention flange 125 extending laterally toward the other arm 120; with the arms 120 in the inward positions, the retention flanges 125 are engaged with a front of the second portion 99; and with the arms 120 in the outward positions, the retention flanges 125 are transversely offset from the front of the second portion 99.

Certain embodiments of the subject application related to a bracket 100 for releasably securing a bicycle lock 90 to a bicycle 70, the bracket 100 comprising: a housing 110 configured for mounting to a frame 72 of the bicycle 70, the housing 110 including a first end portion 115 defining a basket 117 operable to receive a first portion 98 of the bicycle lock 90, the housing 110 including a second end portion 116 opposite the first end portion 115; a pair of opposing arms 120 movably mounted to the second end portion 116 of the housing 110, wherein each arm 120 is movable relative to the housing 110 between an outward position and an inward position, and wherein each arm 120 includes a corresponding and respective rack gear 123; a pinion 130 engaged with each rack gear 123 and correlating movement of the arms 120 such that the arms 120 move in unison with one another between the outward positions and the inward positions; a latch 140 movably mounted to the housing 110 and operable to engage the arms 120, the latch 140 having a latching position in which the latch 140 is operable to maintain the arms 120 in the inward positions, the latch 140 having an unlatching position in which the arms 120 are free to move from the inward positions to the outward positions; and a manual actuator 150 operable to move the latch 140 between the latching position and the unlatching position.

Certain embodiments further comprise an arm biasing mechanism 162 urging the arms 120 toward the outward positions.

Certain embodiments further comprise a latch biasing mechanism 164 urging the latch 140 toward the latching position. In certain embodiments, the arms 120 are configured to move the latch 140 toward the unlatching position as the arms 120 travel from the outward positions toward the inward positions; and the latch biasing mechanism 164 is configured to return the latch 140 to the latching position when the arms 120 reach the inward positions. In certain embodiments, each arm 120 includes a corresponding and respective arm ramp 127; the latch 140 includes a pair of latch ramps 147; and the arm ramps 127 are configured to engage the latch ramps 147 to urge the latch 140 toward the unlatching position as the arms 120 travel from the outward positions toward the inward positions.

In certain embodiments, each of the arms 120 includes a corresponding and respective engagement portion 124 extending away from the housing 110, and a corresponding and respective retention flange 125 extending toward the other of the arms 120. In certain embodiments, the housing 110 includes a base plate 180 positioned between the engagement portions 124; the retention flanges 125 are offset from the base plate 118 by a first offset distance d125 when the arms 120 are in the outward positions; the retention flanges 125 are offset from the base plate 118 by a second offset distance d125' when the arms 120 are in the inward positions; and the second offset distance d125' is less than the first offset distance d125. In certain embodiments, the arms 120 are configured to move at an oblique angle θ122 relative to the base plate 180 between the outward positions and the inward positions; and the oblique angle θ122 is less than 10°.

In certain embodiments, the second end portion 115 of the housing defines a chamber 114 in which the pinion 130 is seated; and the bracket 100 further comprises a cover 106 that encloses the chamber 114. Certain embodiments further comprise a screw 107 securing the cover 106 to the housing 110, the screw 107 including a head 310, 320, 330, 340, 350 defining a tamper-resistant recess 312, 322, 332, 342, 352 that is neither slot shaped, nor hollow-cross shaped, nor hollow-star shaped, nor hollow-hexagon shaped.

In certain embodiments, the pair of arms 120 are configured to move obliquely relative to the housing 110 between the outward positions and the inward positions.

In certain embodiments, the manual actuator 150 comprises a first ramp 154; and the latch 140 comprises a second ramp 144 engaged with the first ramp 154 such that movement of the manual actuator 150 from a deactuating position to an actuating position causes a corresponding movement of the latch 140 from the latching position to the unlatching position. In certain embodiments, the manual actuator 150 is mounted to the housing for linear movement between the deactuating position and the actuating position.

Certain embodiments of the present application relate to an assembly 80 comprising the bracket, further comprising the bicycle lock 90; wherein the bicycle lock 90 is held by the bracket 100 when the arms 120 are in the inward positions; and wherein the bicycle lock 90 is removable from the bracket 100 when the arms 120 are in the outward positions.

Certain embodiments of the present application relate to a method of operating a mounting bracket 100 secured to a bicycle 70, the method comprising: receiving insertion of a first portion 98 of a folding lock 90 into a basket 117 defined by a housing 110 of the mounting bracket 100, wherein the housing 110 has mounted thereon a pair of arms 120, each arm 120 movable between an inner position and an outer position; by an arm biasing mechanism 162 of the mounting bracket 100, biasing the arms 120 toward the outer positions thereof; with the arms 120 in the outer positions thereof, receiving insertion of a second portion 99 of the folding lock 90 between the arms 120, thereby placing the folding lock 90 in a seated position; in response to movement of one arm 120 from the outer position thereof toward the inner position thereof, moving the other arm 120 from the outer position thereof to the inner position thereof, thereby causing retention flanges 125 of the arms 120 to at least partially cover the second portion 99 of the folding lock 90 to prevent pivoting of the folding lock 90 from the seated position; by a latch biasing mechanism 164 of the mounting bracket 100, biasing a latch 140 of the mounting bracket 100 toward a latching position in which the latch 140 retains the arms 120 in the inner positions thereof to thereby retain the mounting bracket 100 in a holding state in which the folding lock 90 is retained in the seated position; and in response to actuation of a manual actuator 150 of the mounting bracket 100, moving the latch 140 to an unlatching position; wherein with the latch 140 in the unlatching position, the biasing of the arm biasing mechanism 162 drives the arms 120 to the outer positions thereof, thereby permitting removal of the folding lock 90.

In certain embodiments, the arms 120 move at oblique angles θ122 relative to the housing 110 between the inner positions thereof and the outer positions thereof.

In certain embodiments, the housing 110 comprises a base plate 118; the retention flanges 125 are offset from the base plate 118 by a first offset distance d125 when the arms 120 are in the outer positions thereof the retention flanges 125 are offset from the base plate 118 by a second offset distance d125' when the arms 120 are in the inner positions thereof and the first offset distance d125 is greater than the second offset distance d125'.

In certain embodiments, each arm 120 includes a corresponding and respective base portion 122 including a corresponding and respective rack gear 123; and moving the other arm 120 from the outer position thereof to the inner position thereof comprises correlating movement of the arms 120 with one another via a pinion 130 engaged with the rack gear 123 of each arm 120 such that movement of the one arm 120 from the outer position thereof toward the inner position thereof causes a corresponding movement of the other arm 120 from the outer position thereof toward the inner position thereof.

Certain embodiments further comprise moving the latch 140 toward the unlatching position in response to movement of the arms 120 from the outer positions thereof toward the inner positions thereof; wherein the latch biasing mechanism 164 returns the latch 140 to the latching position in response to the arms 120 reaching the inner positions thereof. In certain embodiments, moving the latch 140 to the unlatching position comprises engaging a first ramp 144 of the latch 140 with a second ramp 154 of the manual actuator 150 such that movement of the manual actuator 150 in a lateral direction causes movement of the latch 140 in a longitudinal direction.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A bracket for releasably securing a bicycle lock to a bicycle, the bracket comprising:
    a housing configured for mounting to a frame of the bicycle, the housing including a first end portion defining a basket operable to receive a first portion of the bicycle lock, the housing including a second end portion opposite the first end portion;
    a pair of opposing arms movably mounted to the second end portion of the housing, wherein each arm is movable relative to the housing between an outward position and an inward position, wherein each arm includes a corresponding and respective rack gear, and wherein each of the arms includes a corresponding and respective engagement portion extending away from the housing, and a corresponding and respective retention flange extending toward the other of the arms;
    a pinion engaged with each rack gear and correlating movement of the arms such that the arms move in unison with respect to one another between the outward positions and the inward positions;
    a latch movably mounted to the housing and operable to engage the arms, the latch having a latching position in which the latch is operable to maintain the arms in the inward positions, the latch having an unlatching position in which the arms are free to move from the inward positions to the outward positions; and
    a manual actuator operable to move the latch between the latching position and the unlatching position;
    wherein the housing includes a base plate positioned between the engagement portions;
    wherein the retention flanges are offset from the base plate by a first offset distance when the arms are in the outward positions;
    wherein the retention flanges are offset from the base plate by a second offset distance when the arms are in the inward positions; and
    wherein the second offset distance is less than the first offset distance.

2. The bracket of claim 1, further comprising an arm biasing mechanism urging the arms toward the outward positions.

3. The bracket of claim 1, further comprising a latch biasing mechanism urging the latch toward the latching position.

4. The bracket of claim 3, wherein the arms are configured to move the latch toward the unlatching position as the arms travel from the outward positions toward the inward positions; and
    wherein the latch biasing mechanism is configured to return the latch to the latching position when the arms reach the inward positions.

5. The bracket of claim 4, wherein each arm includes a corresponding and respective arm ramp;
    wherein the latch includes a pair of latch ramps; and
    wherein the arm ramps are configured to engage the latch ramps to urge the latch toward the unlatching position as the arms travel from the outward positions toward the inward positions.

6. The bracket of claim 1, wherein the arms are configured to move at an oblique angle relative to the base plate between the outward positions and the inward positions; and
    wherein the oblique angle is less than 10°.

7. The bracket of claim 1, wherein the second end portion of the housing defines a chamber in which the pinion is seated; and wherein the bracket further comprises a cover that encloses the chamber.

8. The bracket of claim 7, further comprising a screw securing the cover to the housing, the screw including a head defining a tamper-resistant recess that is neither slot shaped, nor hollow-cross shaped, nor hollow-star shaped, nor hollow-hexagon shaped.

9. The bracket of claim 1, wherein the pair of arms are configured to move obliquely relative to the housing between the outward positions and the inward positions.

10. The bracket of claim 1, wherein the manual actuator comprises a first ramp; and
wherein the latch comprises a second ramp engaged with the first ramp such that movement of the manual actuator from a deactuating position to an actuating position causes a corresponding movement of the latch from the latching position to the unlatching position.

11. The bracket of claim 10, wherein the manual actuator is mounted to the housing for linear movement between the deactuating position and the actuating position.

12. An assembly comprising the bracket of claim 1, further comprising the bicycle lock;
wherein the bicycle lock is held by the bracket when the arms are in the inward positions; and
wherein the bicycle lock is removable from the bracket when the arms are in the outward positions.

13. A method of operating a mounting bracket secured to a bicycle, the method comprising:
receiving insertion of a first portion of a folding lock into a basket defined by a housing of the mounting bracket, wherein the housing has mounted thereon a pair of arms, each arm movable between an inner position and an outer position;
by an arm biasing mechanism of the mounting bracket, biasing the arms toward the outer positions thereof;
with the arms in the outer positions thereof, receiving insertion of a second portion of the folding lock between the arms, thereby placing the folding lock in a seated position;
in response to movement of one arm from the outer position thereof toward the inner position thereof, moving the other arm from the outer position thereof to the inner position thereof, thereby causing retention flanges of the arms to at least partially cover the second portion of the folding lock to prevent pivoting of the folding lock from the seated position;
by a latch biasing mechanism of the mounting bracket, biasing a latch of the mounting bracket toward a latching position in which the latch retains the arms in the inner positions thereof to thereby retain the mounting bracket in a holding state in which the folding lock is retained in the seated position; and
in response to actuation of a manual actuator of the mounting bracket, moving the latch to an unlatching position;
wherein with the latch in the unlatching position, the biasing of the arm biasing mechanism drives the arms to the outer positions thereof, thereby permitting removal of the folding lock;
wherein the housing comprises a base plate;
wherein the retention flanges are offset from the base plate by a first offset distance when the arms are in the outer positions thereof;
wherein the retention flanges are offset from the base plate by a second offset distance when the arms are in the inner positions thereof; and
wherein the first offset distance is greater than the second offset distance.

14. The method of claim 13, wherein the arms move at oblique angles relative to the housing between the inner positions thereof and the outer positions thereof.

15. The method of claim 13, wherein each arm includes a corresponding and respective base portion including a corresponding and respective rack gear; and
wherein moving the other arm from the outer position thereof to the inner position thereof comprises correlating movement of the arms with one another via a pinion engaged with the rack gear of each arm such that movement of the one arm from the outer position thereof toward the inner position thereof causes a corresponding movement of the other arm from the outer position thereof toward the inner position thereof.

16. The method of claim 13, further comprising moving the latch toward the unlatching position in response to movement of the arms from the outer positions thereof toward the inner positions thereof; and
wherein the latch biasing mechanism returns the latch to the latching position in response to the arms reaching the inner positions thereof.

17. The method of claim 16, wherein moving the latch to the unlatching position comprises engaging a first ramp of the latch with a second ramp of the manual actuator such that movement of the manual actuator in a lateral direction causes movement of the latch in a longitudinal direction.

18. A bracket for releasably securing a bicycle lock to a bicycle, the bracket comprising:
a housing configured for mounting to a frame of the bicycle, the housing comprising a base plate;
a pair of arms movably mounted to the housing, each arm mounted for sliding movement between an inward position and an outward position, each arm comprising:
an engagement portion extending away from the base plate; and
a retention flange extending toward the other of the arms;
a latch operable to selectively retain the arms in the inward positions thereof when the latch is in an engagement position; and
a bias member biasing the latch toward the engagement position;
wherein the retention flanges are offset from the base plate by a first offset distance when the arms are in the outer positions thereof;
wherein the retention flanges are offset from the base plate by a second offset distance when the arms are in the inner positions thereof; and
wherein the first offset distance is greater than the second offset distance.

19. The bracket of claim 18, wherein each arm is configured to move between the outward position thereof and the inward position thereof at an oblique angle that is less than 10°.

20. The bracket of claim 18, wherein at least one of the arms is configured to urge the latch toward a disengagement position as the at least one of the arms moves from the outward position thereof toward the inward position thereof.

21. The bracket of claim 20, wherein the latch includes a latch ramp; and
wherein the at least one of the arms includes an arm ramp configured to engage the latch ramp during movement of the at least one of the arms toward the inward position thereof.

22. The bracket of claim 20, wherein the bias member is configured to return the latch to the engagement position as the at least one of the arms moves toward the inward position thereof.

\* \* \* \* \*